United States Patent [19]

Fujibayashi et al.

[11] Patent Number: 4,910,545
[45] Date of Patent: Mar. 20, 1990

[54] FINDER OPTICAL SYSTEM

[75] Inventors: Kazuo Fujibayashi, Kawasaki; Makoto Sekita, Higashiyamoto; Masaharu Suzuki, Kawasaki; Masatake Kato, Kunitachi, all of Japan

[73] Assignee: Canon Kabushiki Kaisha, Tokyo, Japan

[21] Appl. No.: 241,884

[22] Filed: Sep. 8, 1988

[30] Foreign Application Priority Data

Sep. 9, 1987 [JP] Japan .................................. 62-227123
Sep. 9, 1987 [JP] Japan .................................. 62-227124
Nov. 25, 1987 [JP] Japan .................................. 62-296749
Jun. 20, 1988 [JP] Japan ............................. 63-81369[U]

[51] Int. Cl.⁴ .......................................... G03B 13/08
[52] U.S. Cl. ................................ 354/225; 354/289.1; 352/171
[58] Field of Search ............... 354/219, 224, 225, 155, 354/166, 199, 289.1, 465; 352/171

[56] References Cited

U.S. PATENT DOCUMENTS

| | | | |
|---|---|---|---|
| 4,171,888 | 10/1979 | Shono et al. | 354/225 X |
| 4,217,050 | 8/1980 | Sato et al. | 352/171 X |
| 4,544,250 | 10/1985 | Tanaka et al. | 354/224 X |
| 4,573,781 | 3/1986 | Kato | 354/225 X |

Primary Examiner—L. T. Hix
Assistant Examiner—Brian W. Brown
Attorney, Agent, or Firm—Fitzpatrick, Cella, Harper & Scinto

[57] ABSTRACT

A single reflex type electronic camera includes an imaging lens unit and five reflecting units beyond an image formed by an objective, and a finder optical system wherein an image can be observed with a high finder magnification and at a position easy to observe similar to that found in a single reflex camera using silver salt films.

16 Claims, 7 Drawing Sheets

FINDER OPTICAL SYSTEM

BACKGROUND OF THE INVENTION

1. Field of the Invention

This invention relates to a finder optical system which is suitable for a single reflex electronic camera electrically performing image processing by using an imaging unit, such as an image pickup tube or a CCD.

2. Description of the Prior Art

Figure 1:
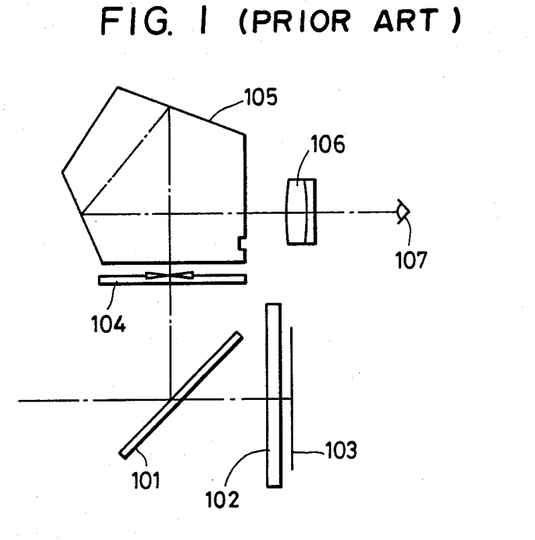
FIG. 1 is a diagram showing a conventional finder device.

Heretofore, single reflex cameras using silver salt films, such as 35 mm films, are becoming the most suitable cameras for use in performing system development. A schematic diagram of a typical prior art finder optical system configuration of a single reflex camera is shown in FIG. 1. In the figure, there are shown a rotatable reflecting mirror 101, a shutter unit 102, a film surface 103, a focusing screen 104, a penta roof prism 105, an eyepiece 106 and a pupil 107 for observation. The finder optical system shown in FIG. 7 has an excellent optical performance of not less than 90% of the ratio of the picture photographed on the film surface to the image of the object observed in the finder optical system, i.e., the field of view ratio, and not less than 0.8 of the magnification of the field of view i.e., field of view magnification in the case of mounting a standard lens. In addition, this finder optical system has a feature that the total device can be constructed in a relatively small size.

However, when the aforementioned penta roof prism is used in the finder optical system of the recently introduced electronic cameras using an imaging unit such as a CCD, it becomes difficult to obtain the same degree of the field of view ratio and the same amount of field of view magnification, as in a conventional single reflex camera. It also becomes difficult to realize miniaturization of the total device. The reasons are as follows:

(1) For example, the effective picture of a ⅔ inch imaging unit is, in the ratio of diagonal length, as small as about ¼ that of 35 mm film, so that if the conventional penta roof prism is used, the optical path length becomes too long, resulting in difficulty of obtaining a high field of view ratio and a high field of view magnification.

(2) Much space is required in the rear portion from the imaging unit for disposing an electric processing circuit, so that the distance from the image surface of the photographic lens to the utmost rear portion of the camera becomes long. For this reason, the position of the pupil of the finder optical system should be extended in the rear portion of the camera side, resulting in difficulty of obtaining a high field of view ratio and a high field of view magnification.

(3) The photographic lens is constituted to be telecentric for the color separation of the imaging unit, so that the spreading of the effective luminous flux from the photographic lens is large in a region in which the finder optical path is divided, resulting in a larger reflecting mirror.

(4) Much space is required in the front portion from the imaging unit for disposing optical units such as a low-pass filter, an infrared-cut filter and a protective glass, so that the distance between the dividing point of the finder optical path and the image surface should be large, resulting in a larger size of the total device.

Figure 2:
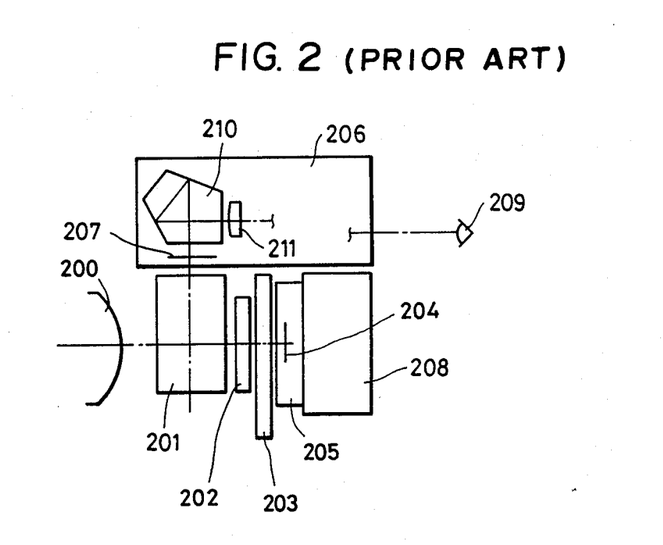
FIG. 2 is a diagram when a conventional finder device is applied to an electronic camera.

Now, for reference purposes, FIG. 2 shows a schematic diagram of a finder optical system intended to achieve not less than 90% of the field of view ratio by using a conventional penta roof prism in an electronic camera.

In FIG. 2, there are shown a photographic lens 200, a dividing unit 201 for dividing the optical path from the photographic optical path into the finder optical system, a low-pass filter 202, a shutter unit 203 and an imaging surface 204 of an imaging unit 205. In the front portion of the imaging unit 205 there is disposed a protective glass having an infrared-cut effect. There is also shown a finder optical system unit 206 including an orthoscopic image erecting system, a focusing screen 207, an electric processing circuit unit 208 for imaging signals and a pupil for observation 209.

In general, as the magnification of the field of view $\gamma$ becomes larger, the observation of the finder image becomes easier. The field of view magnification may be represented as $=f_\theta/f_e$, where $f_\theta$ is the standard focal length of the photographic lens, and $f_e$ is the focal length of the eyepiece. In order to make the magnification of the field of view large, it is necessary to make the focal length of the eyepiece $f_e$ small, since the focal length of the standard lens $f_\theta$ is nearly constant. The eyepiece is disposed so that the front focus thereof is situated near the finder image surface of the finder optical system. Theefore, in order to make the magnification of the field of view large, it is necessary to make the optical passage length of the optical system for obtaining an orthoscopic erecting image from the focusing screen to the eyepiece as short as possible.

However, in the case of an electronic camera, as described above, it is necessary to dispose units such as an infrared-cut filter, a low-pass filter and further an electric processing circuit which electrically processes image information, in front of and behind the image surface of the photographic system. Hence it becomes necessary to shift the movable mirror (the quick-return mirror) guiding the optical flux of the object to the finder optical system to a position more toward the object side (in front), and the observing position more toward a rearward position.

Accordingly, when a construction is adopted wherein the finder image on the focusing screen of the photographic lens is directly observed with the eyepiece, the focal length of the eyepiece becomes necessarily long, resulting in a smaller magnification of field of view and a finder which is difficult to observe. It has been proposed, for example, to have a shorter focal length of the eyepiece, e.g. Japanese Patent Provisional Publication No. 60-43628 (1985); but even in this case the magnification of the finder is limited to about 0.5.

Furthe, the photosensor in the single reflex camera using 35 mm film is, in general, disposed near the eyepiece or near a side portion of the field lens. However, for both cases, the disposition of the photosensor requires a provision of a new space for disposing the photosensor, which is unsuitable for a compact camera. On the other hand, the photographic information display device is also disposed on the image surface of the objective, i.e., on a side portion of the field lens in the side of the camera body.

In recently introduced electronic cameras, however, a space occupied by an electric mounting, such as a processing unit which electrically processes the image, a shutter unit, and further flexible printed circuit boards for electrically connecting these units is large, so that providing a new space itself has become very difficult.

SUMMARY OF THE INVENTION

It is an object of the present invention to provide a finder optical system which is suitable for a single reflex type electronic camera.

It is another object of the present invention to provide a finder optical system which is easy to observe, and which is suitable for the aforementioned electronic camera.

It is another object of the present invention to provide a finder optical system in which the magnification of the finder is improved.

It is a further object of the present invention to provide a finder optical system capable of performing a finder information which is easy to observe, and which is suitable for the aforementioned electronic camera.

It is a still further object of the present invention to provide a disposition and configuration of a photometric device which is suitable for the aforementioned electronic camera.

According to one aspect of the invention, there is provided a finder optical system for observing an image formed by an object having a first optical axis and which comprises optical path splitting means, means forming a predetermined means surface, an eye piece unit, an odd number of reflecting units and an imaging lens unit. The optical path splitting means is arranged to form a second optical axis which extends from the first optical axis. The means forming a predetermined image surface is arranged to form that surface on the second optical axis so that the surface contains an image formed by the object. The reflecting units are arranged to reflect the second optical axis and are situated between the predetermined image surface and the eye piece unit. In addition, the reflecting units include at least a unit directing the second optical axis toward an object side, a unit directing the second optical axis toward a direction approaching the first optical axis and a unit directing the second optical axis toward the eye piece lens unit. The imaging lens unit is located on the second optical axis and is situated between the predetermined image surface and the eye piece lens unit.

According to another aspect of the invention, there is provided a finder optical device of a single reflex camera for observing, through an eye piece, an image formed by an objective lens having an optical axis. The finder optical device comprises first, second, third, fourth and fifth reflecting units and an imaging lens unit. The first reflecting unit is arranged to reflect luminous flux of the image toward an object side. The second reflecting unit is arranged to reflect the luminous flux reflected by the first reflecting unit in a direction away from the optical axis. The third reflecting unit is arranged to reflect the luminous flux reflected by the second reflecting unit toward the observation side. The fourth reflecting unit is arranged to reflect the luminous flux reflected by the third reflecting unit in a direction approaching the optical axis. The fifth reflecting unit is arranged to reflect the luminous flux reflected by the fourth reflecting unit toward the eye piece. The imaging lens unit is situated in the path of luminous flux at a location between the first reflecting unit and the fifth reflecting unit.

A further aspect of the invention comprises a finder optical system for observing an image formed by an object and projected along a first optical axis. This finder optical system comprised dividing means, means forming a predetermined image surface, an imaging lens unit, a plurality of reflecting units, an eye piece unit and a display means. The dividing means of arranged to form a second optical axis which extends from the first optical axis. The means forming a predetermined image surface is arranged to form that surface along the second optical axis such that the surface contains an image formed by the object. The imaging lens unit is situated along the optical axis and beyond the predetermined image surface, and is arranged to form a substantially horizontal image surface. The plurality of reflecting units are situated along the second optical axis and beyond the predetermined image surface. The display means is arranged to display photographic information. The display means is disposed at a location near the image surface and has an optical path length substantially equal to the optical path length from the image surface to the eye piece unit.

The foregoing and still further objects of the present invention will become apparent from the following drawings and description.

DESCRIPTION OF THE PREFERRED EMBODIMENTS

Embodiments of the present invention will hereinafter be explained with reference to the drawings.

Figure 3:
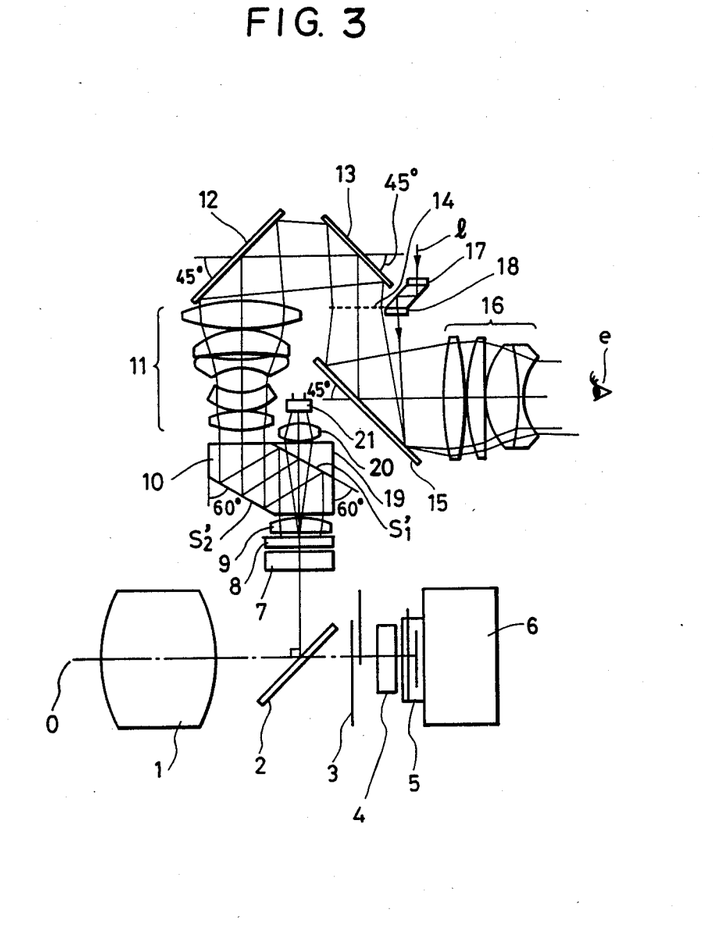
FIG. 3 is a diagrammatic sectional view illustrating a first embodiment of a finder system according to the present invention.

The embodiment of FIG. 3 shows the finder optical system according to the present invention as applied to an electronic camera. In FIG. 3, there are shown in sequence along a horizontal photographic optical axis O, an interchangeable photographic lens 1, a quick-return mirror 2 which retreats outside the photographic luminous flux during photographing, a shutter unit 3, a filter unit 4 including a low-pass filter and an infrared-cut filter, an imaging unit 5 such as a CCD and an electric processing circuit unit 6 which electrically processes the image information output from the imaging unit 5. There are also provided in sequence along a reflecting vertical optical axis formed on the mirror 2 in its observing position, an optical path-compensating plate 7 for making the optical characteristics of the image formed through the filter unit 4 on the imaging unit and the image formed on a focusing screen 8 beyond the plate 7, substantially the equivalent beyond the focusing screen 8 there are provided a condenser lens (field lens) unit 9, a prismatic unit 10 including a first reflecting surface (semi-transmitting surface) $S_1$ and a second reflecting surface $S_2$. A secondary imaging lens unit 11 is located beyond the unit 10 and serves to reimage an image for reimaging an image formed on the focusing screen 8. There are also provided a third reflecting mirror 12 having an angle of 45° relative to the photographic optical axis O, a forth reflecting mirror 13 facing the third mirror 12 and having an angle of 45° relative to the photographic optical axis O, a fifth reflecting mirror 15 facing the fourth mirror 13 and also having an angle of 45° relative to the photographic optical axis O and an eyepiece unit 16. A photographic information display unit 18 ia arranged to photographic information such as iris and shutter speed. A prism 17 is also arranged for guiding the outer light 1 to the display unit 18. Finally, an imaging lens 20 is provided for reimaging the luminous flux issued from the condenser lens 9 on a photosensor 21.

In the configuration described above, luminous flux from an object passes through the photographic lens 1 and through the optical path compensating plate 7 so that its aberration is made equivalent to aberrations of the photographic system including the filter unit 4. The object flux is then imaged on the focusing screen 8 which is at a position optically nearly equal to the position of the image surface within the imaging unit 6. Further, the imaging luminous flux imaged onto the focusing screen 8 is reimaged on the secondary image surface 14 via the prism 10. The prism 10 guides the luminous flux toward the upper portion of the drawing in the direction away from the photographic optical axis O. The flux is guided through the secondary imaging lens 11 and is reflected by the mirror 12 toward the observation side, and then by the mirror 13 toward the lower portion of the drawing in the direction approaching the photographic optical axis O. The luminous flux is then guided toward the eyepiece 16 side via the fifth reflecting mirror 15 and in the direction of an eye point e.

Now, in a primary imaging type finder in which an image on a focusing screen is directly observed with an eyepiece such as in the case of a common single reflex camera using 35 mm film, it is necessary to provide a roof surface to convert the left and right directions so as to form an erect image. In a secondary imaging type finder in which observation is performed with an eyepiece after an image on a focusing screen has been reimaged as is the case with the present invention, the left and right directions are reversed in the secondary imaging system, so that there is no necessity of providing a roof surface as described above. As a result, the optical system is simplified. Although prior to reaching a secondary image surface 14, between the mirrors 13 and 15, the upper and lower directions suffer odd reflections including the quick-return mirror 2 so as to have a reversed image, the upper and lower directions are made to have an erect image by the mirror 15, and an orthoscopic erect image can be observed with the eyepiece 16.

It will be noted that in this embodiment a display unit 18 consisting of liquid crystal, a printed seal, or the like, for displaying photographic information, such as shutter speed and the iris, is disposed on a surface substantially the same as the secondary image surface 14 at a position having an optical path length equal to the optical path length from the secondary image surface 14 to the eyepiece 16. Accordingly, a proper display can be observed by adjusting the apparatus so that the visibility of the image in the finder field of view and the visibility of the display unit are equal.

With the configuration of the present embodiment, i.e., with making the secondary image surface 14 horizontal, it becomes easier to take in the outer light 1, and at the same time it also becomes possible to relatively freely dispose the prism 17 for guiding the outer light 1 to the display unit. It will be also noted that this is useful for saving electric power.

The condenser lens 9 performs the function of matching the exit pupil of the photographic lens 1 with the entrance pupil of the secondary imaging lens 11. By this pupil imaging, the total finder field of view can be observed with a uniform brightness through the eyepiece. The prism 10 reflects the finder optical path obliquely downward to the object side at the first reflecting surface $S_1$ having a 30° inclination with regard to the photographic optical axis, and then folds the optical path by forwarding the finder optical axis upwardly at the second reflecting surface $S_2$ having a 30° inclination with regard to the photographic optical axis. This makes the height of the finder to achieve a compact finder system. The mirror 12 for receiving the finder light radiating from the secondary imaging lens 11 reflects the finder light toward the observation side. The mirror 13 then reflects the finder light downward. Thus, after passing through the secondary image surface 14 the light is reflected to a horizontal direction by the mirror 15. That is, a thorough consideration is provided for operationability by making the height of the eye observing the finder at a proper position.

With the above desribed arrangement, a compact finder optical system can be achieved with an improved finder at the same level as in a single reflex camera using silver salt films. Furthermore, in the case of the primary imaging type, a necessity exists for making the focal length of the eyepiece as short as possible, so that the observation height of the finder approaches the photographic optical axis, resulting in poor operationability. According to the present invention, however, the observing position can be set at a relatively free height.

Now, as shown in FIG. 3, both the photometric imaging lens 20 and the photosensor 21 are disposed at positions such that they efficiently utilize spaces produced when the optical path is folded, i.e., facing the focusing screen 8. Accordingly, a finder optical system having sensitivity distribution of an average photometry with weighing the center portion without parallax and distortion can be obtained even without need to provide new space in keeping with a compact size. It is also easy to realize a desired photometric sensitivity distribution, e.g. of a spot photometric type, by providing a semi-transmitting region with divided areas at the semi-transmitting plane $S_1$.

As in the configuration described above, it is possible to design the total finder optical system including the photometric optical system in a compact size, by disposing the photometric optical system within an effective space, as well as to improve the magnification of a finder on the same level as in a single reflex camera using silver salt films. It will be noted that the photometric positive lens 20 may comprise a Fresnel lens.

A second embodiment of the present invention will now be described with reference to FIG. 4.

Figure 4:
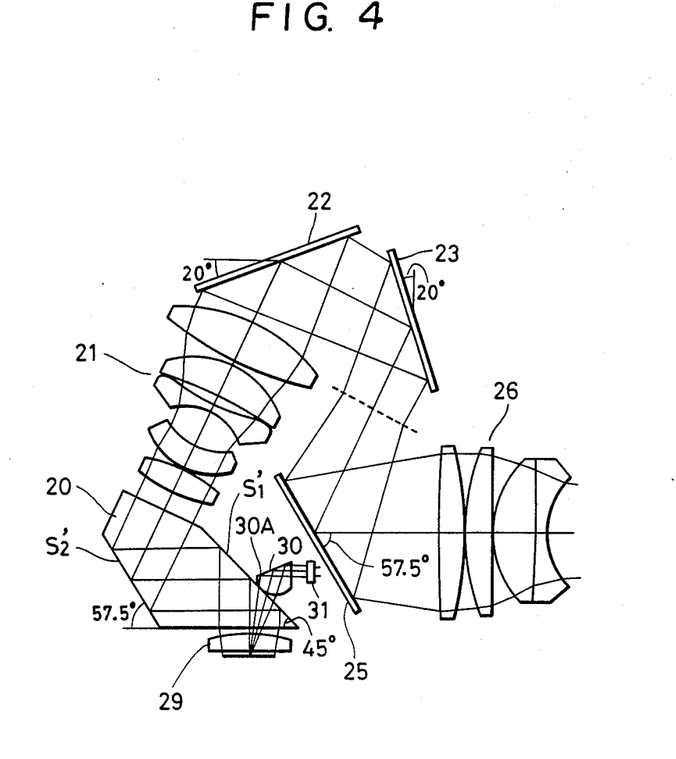
FIG. 4 is a diagrammatic sectional view illustrating a second embodiment of a finder system according to the present invention.

Although the basic configuration of the embodiment of FIG. 4 is the same as the embodiment of FIG. 3, a first reflecting surface $S_1'$ of a prism 20 situated between a condenser lens 29 and a secondary imaging lens 21 in FIG. 4 is configured to have an angle of 45° relative to the photographic optical axis, a second reflecting surface $S_2'$ having an angle relative to the photographic optical axis larger than the first reflecting surface $S_1'$. The optical axis of the secondary imaging lens 21 is made, to some extent, oblique rather than perpendicular to the photographic optical axis. Consequently, mirrors 22, 23 and 25 are disposed at appropriate positions with an inclination so that the observing direction becomes horizontal (parallel to the optical axis of the photographic lens) as in the embodiment of FIG. 3. As can be seen, this results in a configuration which is different from that in FIG. 3.

It is a feature of this invention that by having a configuration which shifts the optical axis more or less from the perpendicular and horizontal positions, it is possible to utilize space more effectively to reduce the height of the camera.

It will be noted that in the present embodiment the main beam of light of the finder is totally reflected at the first reflecting surface $S_1$, but the beam of light which has an angle somewhat different from the main beam of light and does not satisfy the angle condition of total reflection passes the reflecting surface $S_1$ as it is, and is guided to a photosensor 31 by a prism 30 having both beam-condensing and polarizing functions. That is, the luminous flux passing through the reflecting surface $S_1$ is subsequently reflected by a reflecting surface 30A which satisfies the condition of total reflection.

Now, the desired position for disposing a finder information display unit of a single reflex camera, in which an image of the photographic lens is observed with an eyepiece is, in general, on the image surface, and at a location adjacent to the photographic field of view. In a single reflex camera using 35 mm film, the finder information display unit is usually disposed at this position to form a display which is easy to observe.

Figure 5A:
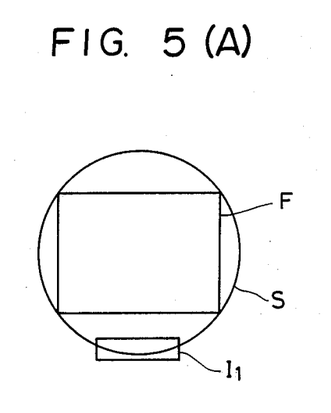
FIGS. 5(A) and 5(B) are diagrams showing how displays within finders are realized according to the present invention.

However, when it is intended to simply dispose a display unit having the same dimensions within a single reflex camera which is a so-called electronic camera, it is not necessarily possible to provide a display which is easy to observe. This results in a display arrangement in which the range of the photographic field of view is separated from the information display portion as shown in FIG. 5 (A). In this figure, F represents the range of the finder field of view, and I represents the range of the finder display.

This separation effect is caused by the fact that in the electronic camera, the picture size is generally very small compared with the picture size of 35 mm film, and the size of the finder information display unit becomes relatively large with regard to the size of the picture.

Next, an embodiment will be explained with reference to FIG. 6 in which the information display is located within a range S (FIG. 5B) so that a display is provided which is easy to observe and which have an excellent optical performance. The finder optical system is basically the same as in FIG. 3.

Now, there is shown a photographic information display unit 52, consisting of liquid crystal or the like, for forming the information display with regard to the iris or for indicating shutter speed and other functions according to the present invention. The display unit 52 is disposed near the secondary image surface 14. On the other hand, this display unit 52 is illuminated by outer light irradiation L from above or by irradiation from an LED 50 via a prism 51 having a diffused base surface. The resulting information light is directed between the mirror 15 and an eyepiece 16; and at the same time it is guided to the eyepiece 16 by a small mirror 53 located in a lower portion outside the finder effective luminous flux. The position of the photographic information display unit is adjusted with adjustment of the optical path length so that the visibility of the finder field of view coincides with the visibility of the display unit. Furthermore, by disposing the display unit nearly parallel with the secondary image surface, i.e., horizontally, it becomes easier to take in the outer illumination.

Figure 5B:
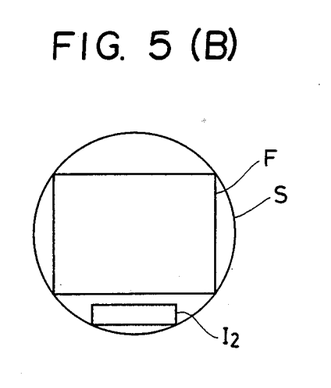

Now, the finder system is usually designed within a diagonal range of the finder field of view (S shown in FIG. 5(A) and 5(B)) in order to permit a smaller lens diameter and at the same time to suppress the appearance of aberration. Outside of this diagonal range, the image performance is deteriorated, and results in a display in the finder which is difficult to observe.

Accordingly, by adopting the configuration of the present embodiment as explained above, as shown in FIG. 5(B), the information display can be disposed within the range S, to provide an image which is easy to observe and which, at the same time, has excellent optical performance.

Figure 6:
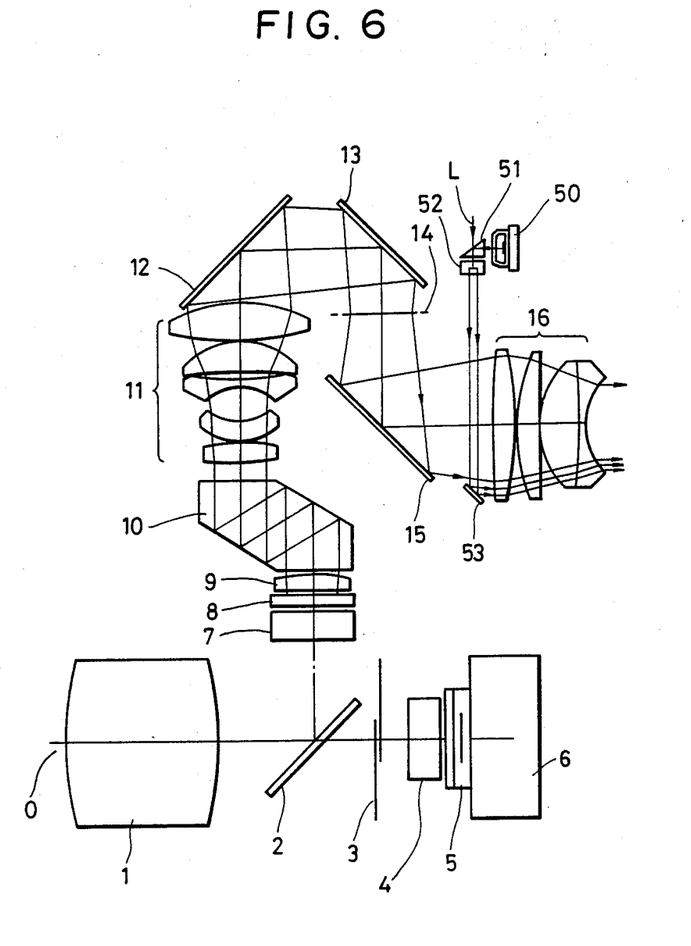
FIG. 6 is a diagrammtic sectional view illustrating an embodiment of a finder device according to the present invention.
Figure 7:
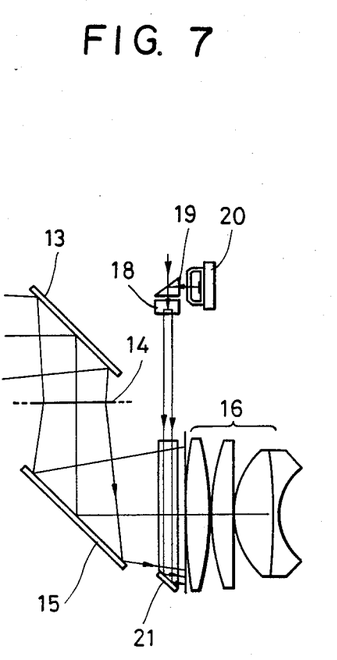
FIG. 7 is a diagrammatic sectional view illustrating another embodiment of a finder device according to the present invention.

FIG. 7 illustrates an example wherein the small mirror 53 shown in FIG. 6 has been replaced by a prism 2.

Figure 8:
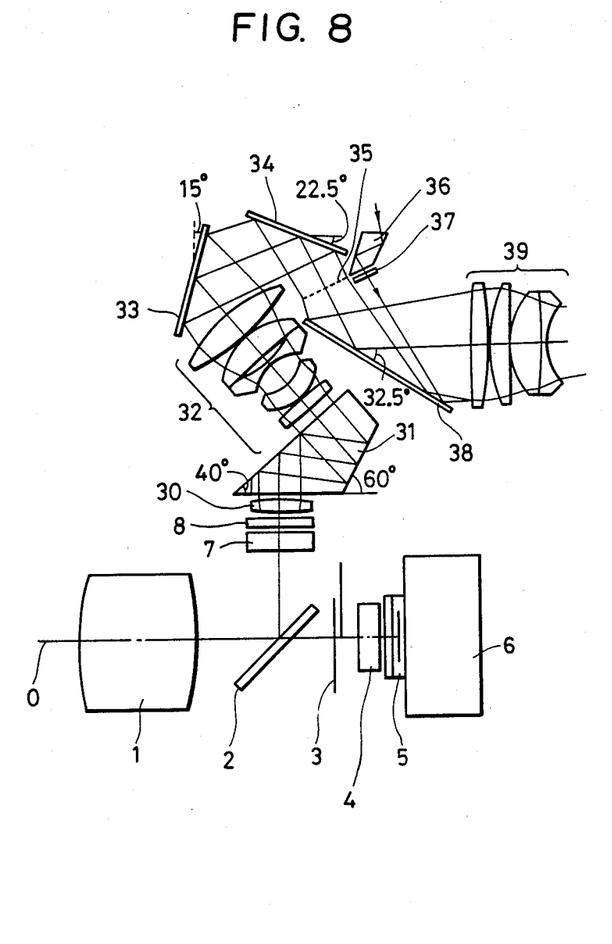
FIG. 8 is a diagrammatic sectional view of a further finder device according to the present invention.

Next, another embodiment will be explained with reference to FIG. 8.

As in the aforementioned embodiments, it is intended to obtain higher magnification with a secondary imaging type finder as well as to fold the optical path in order to have a compact finder system; and it is also intended to dispose the secondary image surface 35 in a nearly horizontal direction. Since units having numerals 1 through 8 are the same as in the above described first embodiment, the explanation thereof will be omitted.

The fider image is enlarged and imaged onto a secondary image surface 35 by a condenser lens 30, a prism 31, a secondary imaging lens 32, a mirror 33 and a mirror 34. Here, the condenser lens 30 images, as described above, the exit pupil of the photographic lens 1 on a plane near the entrance pupil of the secondary imaging lens 32. By this pupil imaging, the total finder field of view can be observed with a uniform brightness when observing through the eyepiece 39. The prism 31 has a first reflecting surface having a 40° inclination with regard to the photographic optical axis and a second reflecting surface having a 60° inclination with regard to the photographic optical axis. The prism 31 reflects the finder optical path toward the observation side, and then folds the optical path so that the finder optical axis is directed obliquely upwardly in the object side to suppress the height of the finder at lower value. It will be noted that the exit surface of the prism 31 forms the same surface as the first reflecting surface to simplify the form of the prism.

After the finder optical path is reflected toward the observation side by the mirror 33, the finder luminous flux is reflected obliquely downwardly toward the photographic optical axis O so as not to interfere with the secondary imaging lens 32. Also, the secondary image surface 35 is imaged so that the lower portion of the finder picture becomes located in a somewhat obliquely upper region. Consequently, this apparatus has a configuration such that the display unit within the finder in a lower portion of the picture can be easily disposed near the secondary image surface. Further, the apparatus also has a configuration, in this embodiment, such that the finder optical path is reflected in a horizontal direction by a mirror 38 disposed under the secondary image surface 35 so as to be observable via the eyepiece 39. A consideration regarding operationability of the apparatus that the height of the eye observing the finder can be set by the mirrors 34 and 38 at a proper position with regard to the photographic optical axis. In FIG. 8 also, a display unit 37, such as a liquid crystal, is disposed on a surface nearly the same as the secondary image surface 35; and by taking in external light via a prism 36 to illuminate the display unit 37, the display within the finder can be observed in a lower portion of the finder picture through the mirror 38 and the eyepiece 39.

As explained above, by adopting a second imaging type finder in a single reflex electronic camera, a higher magnification can be realized, and at the same time by properly folding the optical path, a compact finder can be designed. Furthermore, by disposing the secondary image surface in a horizontal direction, there results an increase in the number and disposition of display components within the finder. In addition, the outer light illumination becomes easier to provide, and the configuration of the display system becomes relatively simpler.

Incidentally, an embodiment of numerical values of a finder optical system with regard to the first embodiment will be shown in the table hereinbelow.

Here, Ri is the radius of curvature of the i-th lens surface in descending order from the forwarding direction of luminous flux, Di is the thickness of the i-th lens, and air intervals Ni and Vi are the refractive index and the Abbe number of the glass of the i-th lens, respectively.

| i | Ri | Di | Ni | Vi | |
|---|---|---|---|---|---|
|  | ∞ | 0.5 | 1.00 |  | (Primary image surface) |
| 1 | ∞ | 2.00 | 1.52 | 64.1 | (condenser lens) |
| 2 | −20.0 | 0.50 | 1.00 |  |  |
| 3 | ∞ | 26.00 | 1.52 | 64.1 | (prism) |
| 4 | ∞ | 2.62 | 1.00 |  |  |
| 5 | 32.5 | 2.20 | 1.77 | 49.6 |  |
| 6 | −28.4 | 0.15 | 1.00 |  |  |
| 7 | 7.1 | 2.50 | 1.70 | 55.5 |  |
| 8 | 6.4 | 4.28 | 1.00 |  |  |
| 9 | −6.8 | 0.80 | 1.81 | 25.4 | secondary imaging lens |
| 10 | 34.5 | 0.70 | 1.00 |  |  |
| 11 | −101.8 | 4.00 | 1.66 | 60.7 |  |
| 12 | −9.5 | 0.15 | 1.00 |  |  |
| 13 | 43.0 | 4.20 | 1.77 | 49.6 |  |
| 14 | −19.2 | 32.20 | 1.00 |  |  |
| 15 | ∞ | 27.24 | 1.00 |  | (secondary image surface) |
| 16 | 77.4 | 2.80 | 1.60 | 60.7 |  |
| 17 | −44.5 | 0.15 | 1.00 |  |  |
| 18 | 22.2 | 3.00 | 1.66 | 60.7 |  |
| 19 | 2355.6 | 0.15 | 1.00 |  | (eyepiece) |
| 20 | 11.6 | 4.50 | 1.60 | 60.7 |  |
| 21 | −83.9 | 1.00 | 1.69 | 31.1 |  |
| 22 | 8.2 | 18.00 | 1.00 |  |  |
| 23 |  | 0.0 | 1.00 |  | (eyepoint) |

The focal length of the condenser lens: f=38.74
The focal length of the secondary imaging lens: f=20
The focal length of the eyepiece: f=22
The secondary imaging magnification: 1.25
The visibility: −1 diopter
The magnification of field of view: 0.71
(With the assumption that the standard focal length of the photographic lens is 12.5 mm)

What is claimed is:

1. A finder optical system for observing an image formed by an object having a first optical axis comprising:
   optical path splitting means for forming a second optical axis which extends from said first optical axis;
   means forming a predetermined image surface on said second optical axis, to contain an image formed by the object;
   an eyepiece lens unit;
   an odd number of reflecting units for reflecting said second optical axis, and situated between said predetermined image surface and said eyepiece lens unit;
   said reflecting units at least having a unit directing said second optical axis toward an object side, a unit directing said second optical axis toward a direction approaching the first optical axis, and a unit directing said second optical axis toward said eyepiece lens unit; and
   an imaging lens unit on said second optical axis, and situated between said predetermined image surface and said eyepiece lens unit.

2. A finder system according to claim 1 wherein the number of said reflecting units is five.

3. A finder optical system according to claim 1 wherein said second optical axis is successively directed toward an object side by a first reflecting unit, toward a direction away from said first optical axis by a second reflecting unit, toward the observation side by a third reflecting unit, toward a direction approaching the first optical axis by a forth reflecting unit, and toward the eyepiece lens unit side by a fifth reflecting unit.

4. A finder optical system according to claim 1 wherein said second optical axis is successively directed toward the observation side by a first reflecting unit, toward a direction away from said first optical axis by a second reflecting unit, toward the observation side by a third reflecting unit, toward a direction approaching the first optical axis by a forth reflecting unit, and toward the eyepiece lens unit side by a fifth reflecting unit.

5. A finder optical system according to claim 1 wherein said unit for directing said second optical axis toward an object side comprises means forming a semi-transmitting surface, and wherein photometric means is situated at a position in the path of luminous flux from said semi-transmitting surface.

6. A finder optical system according to claim 3 or claim 4 wherein said imaging lens unit is constructed and arranged to form an image surface between said forth and fifth reflecting units.

7. A finder optical system according to claim 3 or claim 4 wherein said first and second reflecting units are prismatic elements.

8. A finder optical system according to claim 7 wherein said prismatic elements are portions of one unit.

9. A finder optical device of a single reflex camera for observing, through an eyepiece, an image formed by an objective lens having an optical axis, said finder optical device comprising:
   a first reflecting unit for reflecting luminous flux of the image toward an object side;
   a second reflecting unit for reflecting the luminous flux reflected by said first reflecting unit in a direction away from said optical axis;

a third reflecting unit for reflecting the luminous flux reflected by said second reflecting unit toward the observation side;

a forth reflecting unit for reflecting the luminous flux reflected by said third reflecting unit in a direction approaching said optical axis;

a fifth reflecting unit for reflecting the luminous flux reflected by said forth reflecting unit toward said eyepiece; and an imaging lens unit situated in the path of luminous flux at a location between said first reflecting unit and said fifth reflecting unit.

10. A finder optical device according to claim 9 wherein said imaging lens unit is situated between said second and third reflecting units, and wherein the image surface of the imaging lens unit is situated between said forth and fifth reflecting units.

11. A finder optical device according to claim 9 wherein said first reflecting unit includes a semi-transmitting surface, and wherein photometric means is situated in the path of luminous flux transmitted from said semi-transmitting surface.

12. A finder optical device according to claim 9 wherein the image surface of said imaging lens unit is substantially parallel to said optical axis.

13. A finder optical device according to claim 12 further including display means for displaying photographic information, said display means being situated near the image surface of said imaging lens unit.

14. A finder optical device according to claim 13 further including a reflecting unit for reflecting the luminous flux from said display means toward the eyepiece, said reflecting unit being situated between said eyepiece and said fifth reflecting unit.

15. A finder optical system for observing an image formed by an object and projected along a first optical axis, said system comprising:

dividing means for forming a second optical axis which extends from said first optical axis;

means forming a predetermined image surface on said second optical axis, to contain an image formed by the object;

an imaging lens unit situated along the second optical axis and beyond said predetermined image surface;

a plurality of reflecting units situated along said second optical axis and beyond said predetermined image surface;

said imaging lens unit being arranged to form a substantially horizontal image surface;

an eyepiece lens unit; and a display means for displaying the photographic information, said display means being disposed at a location near said image surface, and having an optical path length substantially equal to the optical path length from said image surface to said eyepiece unit.

16. A finder optical system according to claim 15 wherein the information light of said display means is arranged to be illuminated by external light.

* * * * *

UNITED STATES PATENT AND TRADEMARK OFFICE
CERTIFICATE OF CORRECTION

PATENT NO. : 4,910,545

DATED : March 20, 1990

INVENTOR(S) : FUJIBAYASHI, ET AL.

It is certified that error appears in the above-identified patent and that said Letters Patent is hereby corrected as shown below:

Title Page:

AT [75] Inventors:

"Makoto Sekita, Higashiyamoto" should read --Makoto Sekita, Higashiyamato--.

COLUMN 2:

Line 26, "Theefore," should read --Therefore,--.
Line 52, "Furthe," should read --Further,--.

COLUMN 3:

Line 25, "eye piece" should read --eyepiece--.
Line 34, "eye piece" should read --eyepiece--.
Line 39, "eye piece" should read --eyepiece--.
Line 42, "eye piece" should read --eyepiece--.
Line 45, "eye piece," should read --eyepiece,--.
Line 67, ", means" should read --means--.

UNITED STATES PATENT AND TRADEMARK OFFICE
CERTIFICATE OF CORRECTION

PATENT NO. : 4,910,545

DATED : March 20, 1990

INVENTOR(S) : FUJIBAYASHI, ET AL.

It is certified that error appears in the above-identified patent and that said Letters Patent is hereby corrected as shown below:

COLUMN 4:

Line 1, "eye piece" should read --eyepiece--.
    Line 2, "of" should read --are--.
    Line 17, "eye piece" should read --eyepiece--.
    Line 36, "diagrammtic" should read --diagrammatic--.

COLUMN 5:

Line 7, "forth" should read --fourth--.
    Line 13, "ia" should read --is--.
    Line 38, "eye point" should read --eyepoint--.

COLUMN 6:

Line 32, "desribed" should read --described--.

COLUMN 7:

Line 56, "have" should read --has--.

UNITED STATES PATENT AND TRADEMARK OFFICE
CERTIFICATE OF CORRECTION

PATENT NO. : 4,910,545

DATED : March 20, 1990

INVENTOR(S) : FUJIBAYASHI, ET AL.

It is certified that error appears in the above-identified patent and that said Letters Patent is hereby corrected as shown below:

COLUMN 8:

Line 13, "Fig." should read --Figs.--.
Line 36, "fider" should read --finder--.

Signed and Sealed this

Twentieth Day of October, 1992

Attest:

DOUGLAS B. COMER

Attesting Officer     Acting Commissioner of Patents and Trademarks